(12) United States Patent
Arbel et al.

(10) Patent No.: US 9,990,131 B2
(45) Date of Patent: Jun. 5, 2018

(54) MANAGING MEMORY IN A MULTIPROCESSOR SYSTEM

(71) Applicant: Xilinx, Inc., San Jose, CA (US)

(72) Inventors: Ygal Arbel, Morgan Hill, CA (US); Sagheer Ahmad, Cupertino, CA (US); James J. Murray, Los Gatos, CA (US); Nishit Patel, San Jose, CA (US); Ahmad R. Ansari, San Jose, CA (US)

(73) Assignee: XILINX, INC., San Jose, CA (US)

( * ) Notice: Subject to any disclaimer, the term of this patent is extended or adjusted under 35 U.S.C. 154(b) by 233 days.

(21) Appl. No.: 14/493,081

(22) Filed: Sep. 22, 2014

(65) Prior Publication Data
US 2016/0085449 A1    Mar. 24, 2016

(51) Int. Cl.
*G06F 3/06* (2006.01)
*G06F 13/16* (2006.01)
*G06F 9/30* (2018.01)

(52) U.S. Cl.
CPC .......... *G06F 3/0604* (2013.01); *G06F 3/0655* (2013.01); *G06F 3/0683* (2013.01); *G06F 9/3004* (2013.01); *G06F 13/1657* (2013.01); *G06F 2003/0697* (2013.01)

(58) Field of Classification Search
CPC ............. G06F 13/1684; G06F 13/4022; G06F 13/4068; G06F 13/4234; G06F 13/1657; G06F 2003/0697; G06F 3/0604; G06F 3/0655; G06F 3/0683; G06F 9/3004
See application file for complete search history.

(56) References Cited

U.S. PATENT DOCUMENTS

| | | | | |
|---|---|---|---|---|
| 6,516,387 | B1 * | 2/2003 | Auracher | G06F 12/0848 711/123 |
| 8,028,144 | B2 * | 9/2011 | Hampel | G06F 13/1684 710/20 |
| 2005/0268070 | A1 * | 12/2005 | Baxter | G06F 8/447 711/203 |
| 2006/0004976 | A1 * | 1/2006 | Rader | G06F 13/1684 711/167 |
| 2008/0028127 | A1 * | 1/2008 | Ware | G06F 12/02 711/100 |

(Continued)

FOREIGN PATENT DOCUMENTS

| WO | 2010012566 | 2/2010 |
|---|---|---|
| WO | 2012170615 | 12/2012 |
| WO | 2013141921 | 9/2013 |

*Primary Examiner* — Zhuo Li
(74) *Attorney, Agent, or Firm* — Robert M. Brush

(57) ABSTRACT

In an example, a circuit to manage memory between a first and second microprocessors each of which is coupled to a control circuit, includes: first and second memory circuits; and a switch circuit coupled to the first and second memory circuits, and memory interfaces of the first and second microprocessors, the switch circuit having a mode signal as input. The switch is configured to selectively operate in one of a first mode or a second mode based on the mode signal such that, in the first mode, the switch circuit couples the first memory circuit to the memory interface of the first microprocessor and the second memory circuit to the memory interface of the second microprocessor and, in the second mode, the switch circuit selectively couples the first or second memory circuits to the memory interface of either the first or second microprocessor.

20 Claims, 5 Drawing Sheets

(56) References Cited

U.S. PATENT DOCUMENTS

2009/0240897 A1     9/2009  Kajigaya
2012/0317356 A1*   12/2012  Ignatowski ......... G06F 13/1657
                                                            711/114
2015/0278091 A1*   10/2015  Wilkerson ........... G11C 7/1072
                                                            711/105

* cited by examiner

MANAGING MEMORY IN A MULTIPROCESSOR SYSTEM

FIELD OF THE INVENTION

Examples of the present disclosure generally relate to multiprocessor systems and, more particularly, to managing memory in a multiprocessor system.

BACKGROUND

Multiprocessing or multiprocessor systems involve the use of two or more central processing units (CPUs) in a single system. For example, an integrated circuit (IC), such as an application specific integrated circuit (ASIC), field programmable gate array (FPGA), or the like may have multiple microprocessors embedded therein that are capable of being used for multiprocessing. The microprocessors can be multiple distinct microprocessors, or multiple cores of a single microprocessor. Microprocessors have various interfaces used to send and receive information, including memory interfaces.

Microprocessors can have memory interfaces to various types of memory, including cache memory, local memory, main memory or the like, where the different types of memory can be differentiated by latency and/or function. For example, cache memory is low latency memory used to cache information stored in main memory so that it is more readily accessible by the microprocessor. Main memory is higher latency memory capable of storing larger amounts of information than cache memory. Local memory can be low latency memory (similar to cache memory) that does not operate as a cache. For example, some microprocessors having the ARM® architecture include what are known as "tightly coupled memory" interfaces that can be used to access low latency (non-cache) memory. In multiprocessor systems, resources such as memories need to be managed effectively to avoid inefficient or wasteful use thereof.

SUMMARY

Managing memory in a multiprocessor system is described. In an example implementation, a circuit to manage memory between a first microprocessor and a second microprocessor each of which is coupled to a control circuit, includes: first memory circuit and second memory circuit; and a switch circuit coupled to the first memory circuit, the second memory circuit, and memory interfaces of the first and second microprocessors, the switch circuit having a mode signal as input. The switch is configured to selectively operate in one of a first mode or a second mode based on the mode signal such that, in the first mode, the switch circuit couples the first memory circuit to the memory interface of the first microprocessor and the second memory circuit to the memory interface of the second microprocessor and, in the second mode, the switch circuit selectively couples the first or second memory circuits to the memory interface of either the first or second microprocessor.

In another example implementation, an integrated circuit, includes: first and second microprocessors; a control circuit coupled to the first and second microprocessors; first and second memory circuits; and a switch circuit coupled to the first memory circuit, the second memory circuit, and the control circuit, the switch circuit having a mode signal as input. The switch circuit is configured to selectively operate in one of a first mode or a second mode based on the mode signal such that, in the first mode, the switch circuit couples the first memory circuit to a memory interface of the first microprocessor and the second memory circuit to a memory interface of the second microprocessor and, in the second mode, the switch circuit selectively couples the first or second memory circuits to the memory interface of either the first or second microprocessor.

In another example implementation, a method of managing memory between a first microprocessor and a second microprocessor each of which is coupled to a control circuit, includes: configuring the first microprocessor and the second microprocessor to be in a first mode where each of the first and second microprocessors do not operate independently; configuring first memory associated with the first microprocessor and second memory associated with the second microprocessor to be combined memory having a combined address space; and selectively coupling the first or second memory to either the first or second microprocessor as the first or second microprocessor accesses the combined memory.

Other features will be recognized from consideration of the Detailed Description and Claims, which follow.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Managing memory in a multiprocessor system is described. In an example, a circuit to manage memory between a first microprocessor and a second microprocessor each coupled to a control circuit is provided. The circuit includes first and second memory circuits and a switch that couples the first and second memory circuits to memory interfaces of the first and second microprocessors. The switch circuit can operate in two different modes: In a first mode, the switch circuit couples the first memory circuit to the memory interface of the first microprocessor and the second memory circuit to the interface of the second microprocessor. In a second mode, the switch circuit selectively couples the first or second memory circuits to the memory interface of either the first or second microprocessor. The first mode of the switch circuit can be used when the microprocessors are operating independently, each having access to a separate one of the memories associated therewith. The second mode of the switch circuit can be used when the microprocessors are operating in a non-independent mode, such as in lockstep mode or in single processor mode. In the second mode, the two memory circuits are combined to form a single combined memory having a combined address space. Either microprocessor can access the combined memory through the switch circuit, which selectively couples either the first or second memory circuit as needed. In this manner, both memory circuits can be utilized when the microprocessors operate in lockstep or single processor mode, even in cases where the first memory circuit is generally associated with the first microprocessor and the second memory circuit is generally associated with the second microprocessor.

Figure 1:
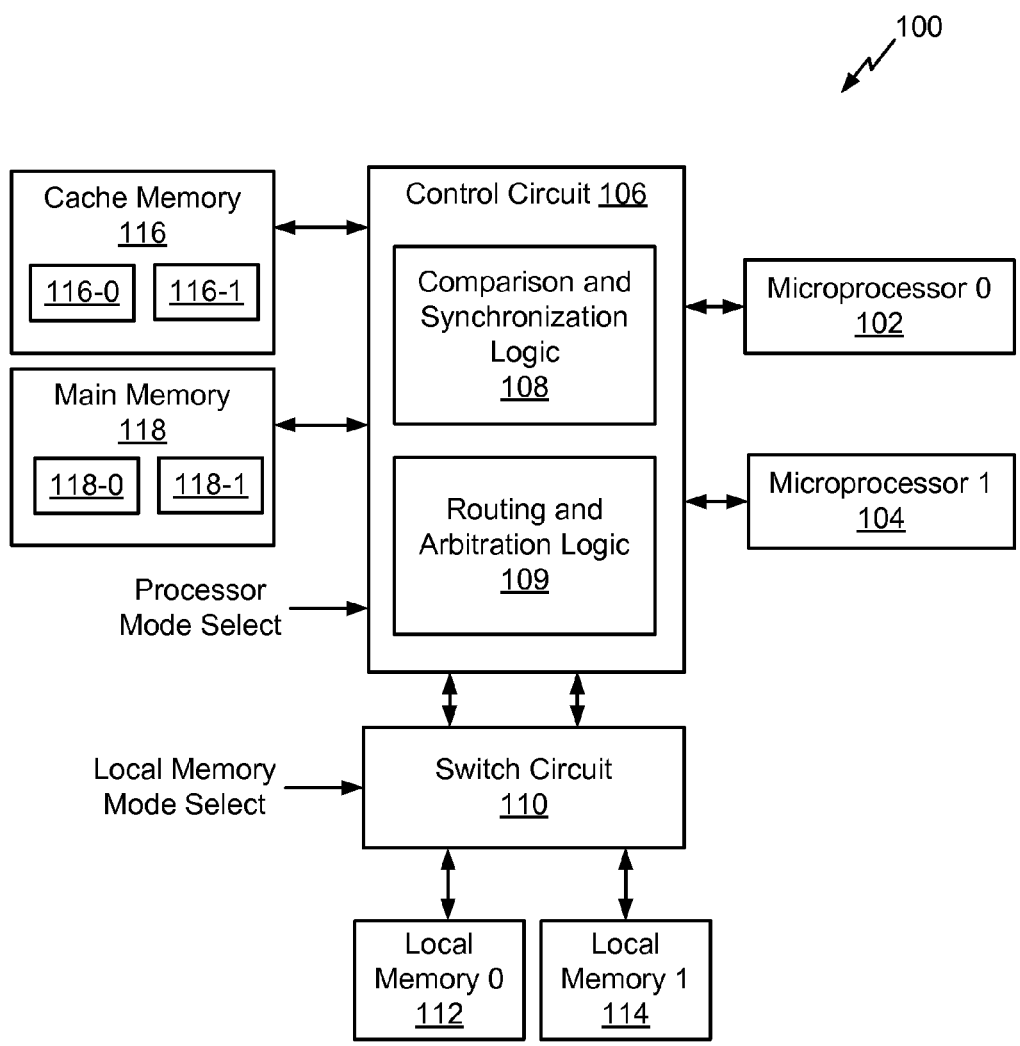
FIG. 1 is a block diagram depicting a processing system according to an example implementation.

FIG. 1 is a block diagram depicting a processing system 100 according to an example implementation. The processing system 100 includes microprocessors 102 and 104, a control circuit 106, a switch circuit 110, and local memory circuits 112 and 114 (also referred to as "memory circuits"). The microprocessor 102 may be referred to as "microprocessor 0" and the microprocessor 104 may be referred to as "microprocessor 1". Likewise, the local memory circuit 112 may be referred to as "local memory 0" and the local memory circuit 114 may be referred to as "local memory 1". Each of the microprocessors 102 and 104 includes an interface coupled to the control circuit 106. Each of the local memory circuits 112 and 114 includes an interface coupled to the switch circuit 110. The switch circuit 110 includes interfaces coupled to the control circuit 106. The control circuit 106 includes an interface to receive a processor mode select signal. The switch circuit 110 includes an interface configured to receive local memory mode select signal. Interfaces of the control circuit 106 may also be coupled to cache memory 116 and main memory 118. The cache memory 116 can include specific memory 116-0 and 116-1 dedicated for use by the microprocessors 102 and 104, respectively. Likewise, the main memory 118 can include memory 118-0 and 118-1. The term "coupled" as used herein is meant to encompass direct connection between elements (e.g., the connection between the microprocessor 102 and the control circuit 106) and communication between elements, which may be through at least one intermediate element (e.g., communication between the microprocessor 102 and the local memory 112).

Each of the microprocessors 102 and 104 can be a programmable device that accepts digital data as input, processes the digital data according to instructions of an instruction set, and provides results as output. The term "microprocessor" as used herein is meant to include any such programmable device, including microcontrollers or other system-on-chip (SoC) devices. Each of the microprocessors 102 and 104 can be stand-alone devices, including separate integrated circuits (ICs) or separate devices embedded in an IC. Alternatively, the microprocessors 102 and 104 can be two microprocessor "cores" of a single device. In a non-limiting example, the microprocessors 102 and 104 can be reduced instruction set computing (RISC) devices, such as a dual-core ARM® Cortex®-R5 processor or like type processor having an ARM® architecture. It is to be understood that the microprocessors 102 and 104 can be other types of devices that include the functionality described herein.

The control circuit 106 is coupled to input/output (IO) interfaces of the microprocessors 102 and 104. The control circuit 106 includes comparison and synchronization logic 108 and routing and arbitration logic 109. The control circuit 106 can configure the microprocessors 102 and 104 to operate in various processor modes. The control circuit 106 can select a mode for the microprocessors 102 and 104 based on a mode select signal provided as input.

In one processor mode, the control circuit 106 configures the microprocessors 102 and 104 to operate in lockstep ("lockstep processor mode"). When operating in lockstep, one of the microprocessors is used as a redundant processor, and both microprocessors process the same data according to the same instructions. The comparison and synchronization logic 108 synchronizes the microprocessors 102 and 104 when in lockstep mode and compares the output of each processor during operation. The routing and arbitration logic 109 synchronizes access to the cache memory 116, the main memory 118, and the switch circuit 110 among the microprocessors 102 and 104 operating in lockstep.

In another mode, the control circuit 106 disables one of the microprocessors 102 and 104 while the other microprocessor is operating ("single processor mode"). In single processor mode, the routing and arbitration logic 109 provides access to the cache memory 116, the main memory 118, and the switch circuit 110 to the operating one of the microprocessors 102 or 104.

In another mode, the control circuit 106 configures the microprocessors 102 and 104 to operate independently, each processing independent data according to independent instructions ("independent processor mode"). Each microprocessor 102 and 104 can access the cache memory 116, the main memory 118, and the switch circuit 110 through the routing and arbitration logic 109. The routing and arbitration logic 109 synchronizes access to the cache memory 116, the main memory 118, and the switch circuit 110 among the microprocessors 102 and 104. In an example, the routing and arbitration logic 109 can provide direct links between the microprocessors 102 and 104 and respective portions of the cache memory 116 and the main memory 118. Likewise, the switch circuit 110 can include a separate portion for each microprocessor 102 and 104 such that there is no sharing or contention to resources between the microprocessors 102 and 104 when operating in independent mode.

The microprocessors 102 and 104 can have several types of memory interfaces, such as local memory interfaces coupled to local memory (e.g., local memory 112/114), cache memory interfaces coupled to the cache memory 116 and main memory interfaces coupled to the main memory 118. The memory interfaces can be divided into levels (e.g., L1, L2, L3, etc., and main). L1, L2, L3, etc. memory includes cache memory, which caches information stored by main memory. That is, the cache memory 116 is backed by the main memory 118. For simplicity, the cache memory 116 is shown generally, but it is to be understood that the cache memory 116 can include separate memory circuits for instruction and data cache for each of the microprocessors 102 and 104. The levels of memory indicate latency, with L1 memory having less latency than L2, L2 memory having less latency than L3, and so on with the main memory having the highest latency.

The local memory interfaces of the microprocessors 102 and 104 can operate at a cache level (e.g., L1), but are used to access non-cache local memory. That is, the local memories 112 and 114 are not backed by the main memory 118 and do not operate as explicit cache memories. Rather, the local memories 112 and 114 each forms a continuous area of memory that is always valid when in use by the microprocessors 102 and 104 (as opposed to explicit cache memory).

Of course, the local memory 112 or 114 can store data that also happens to be stored in main memory 118, but not as an explicit cache. The local memory circuits 112 and 114 can have much lower latency than the main memory 118 (e.g., on the order of L1 cache). For example, ARM® Cortex®-R5 processors and like ARM®-type processors include tightly-coupled memory (TCM) interfaces that can be used to access local memories, which can operate as non-cache memories.

In the processing system 100, the routing and arbitration logic 109 couples the local memory interfaces of the microprocessors 102 and 104 to the switch circuit 110. In general, the microprocessor 102 is associated with the local memory 112, and the microprocessor 104 is associated with the local memory 114. The switch circuit 110 couples the local memories 112 and 114 to the microprocessors 102 and 104 according to different modes depending on the input local memory mode select signal.

In a first mode, the switch circuit 110 couples the local memory 112 to the microprocessor 102 and the local memory 114 to the microprocessor 104 ("independent local memory mode"). In the independent local memory mode, each of the microprocessors 102 and 104 has an independent local memory. The switch circuit 110 can invoke the independent local memory mode when the microprocessors 102 and 104 are operating in independent mode. As such, each microprocessor 102 and 104 has access to its own local memory 112 and 114, respectively.

In a second mode, the switch circuit 110 selectively couples the local memory 112 or the local memory 114 to one of the microprocessors 102 or 104 ("combined local memory mode"). In the combined local memory mode, the switch circuit 110 allows either microprocessor 102 or microprocessor 104 to have access to a combined memory formed from both local memories 112 and 114. The switch circuit 110 can invoke the combined local memory mode when the microprocessors 102 and 104 are operating non-independently, such as when the microprocessors 102 and 104 are operating in the lockstep processor mode or the single processor mode. By selectively forming a combined memory, both of the local memories 112 and 114 can be utilized when the microprocessors 102 and 104 are operating in lockstep processor mode or single processor mode. If the local memories 112 and 114 were directly coupled to their respective microprocessors 102 and 104, one of the local memories 112 and 114 would not be utilized in lockstep mode and would be an unused resource.

In an example, the processor mode and memory mode can be set independently of one another. For example, the processor mode can be set to operate in independent mode, and the memory mode can be set to combined local memory mode so that only one of the processors has access to all of the memory.

Figure 2:
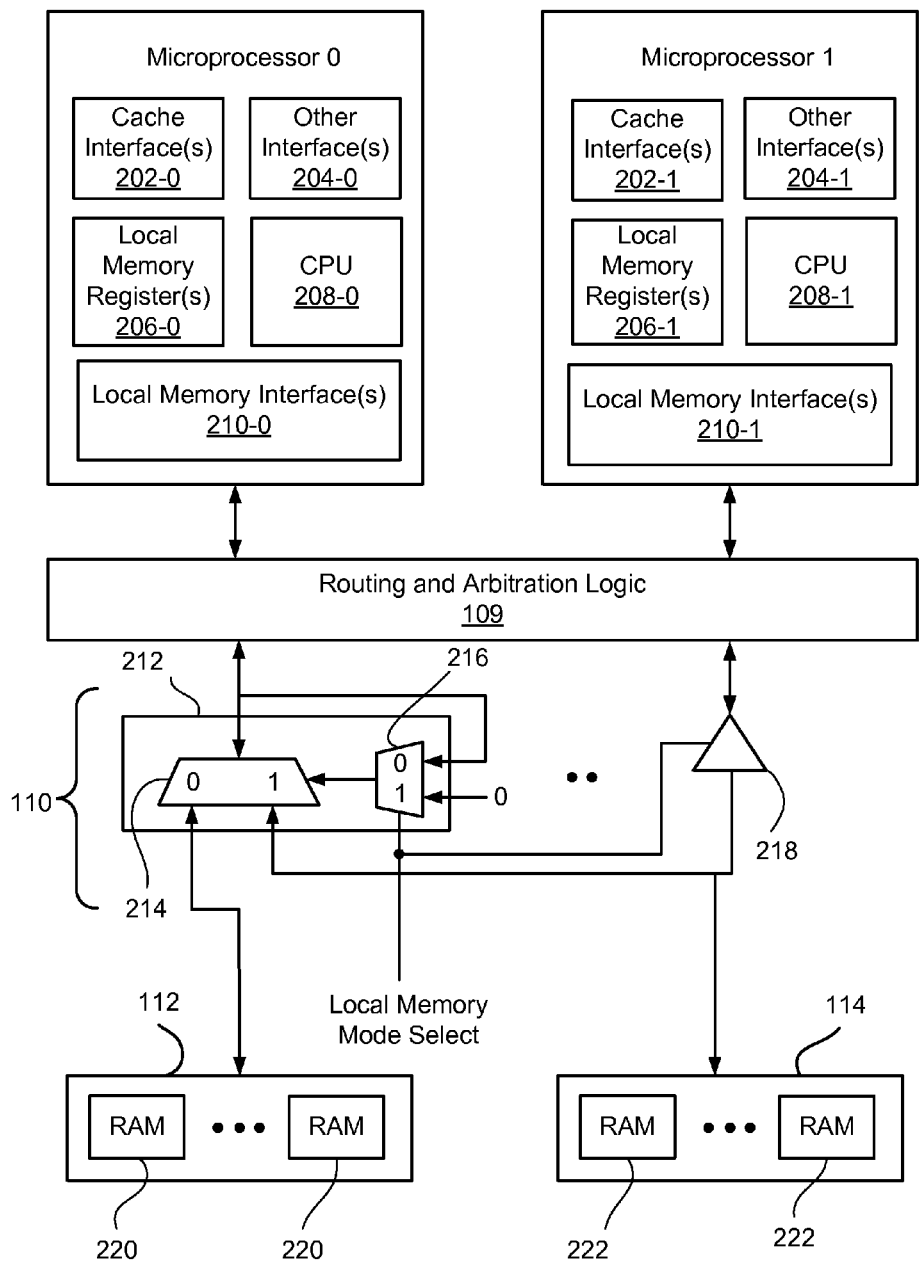
FIG. 2 is a block diagram depicting a more detailed portion of the processing system of FIG. 1 according to an example implementation.

FIG. 2 is a block diagram depicting a more detailed portion of the processing system 100 according to an example implementation. Elements of FIG. 2 that are the same or similar to those of FIG. 1 are designated with identical reference numerals and are described in detail above. The microprocessor 0 includes cache interface(s) 202-0, other interface(s) 204-0, local memory register(s) 206-0, a central processing unit (CPU) 208-0, and local memory interface(s) 210-0. Similarly, the microprocessor 1 includes cache interface(s) 202-1, other interface(s) 204-1, local memory register(s) 206-1, a CPU 208-1, and local memory interface(s) 210-1. The local memory 112 includes at least one random access memory (RAM) circuit 220, and the local memory 114 includes at least one RAM circuit 222.

RAM circuits 220 and 222 can include any type of RAM, such as static RAM (SRAM) or the like. In an example, each of the local memories 114 and 116 can implement error-correcting code (ECC) memory for use with ECC logic in the microprocessors 102 and 104.

The cache interfaces 202-0 and 202-1 can be coupled to cache memory (e.g., the cache memory 116). The other interfaces 204-0 and 204-1 can be coupled to various components, such as the main memory 118 and the control circuit 106. The CPUs 208-0 and 208-1 include processing elements of the microprocessors 0 and 1. The local memory interfaces 210-0 and 210-1 can be coupled to a local memory. The local memory registers 206-0 and 206-1 can include one or more registers to facilitate addressing the local memory. The local memory interfaces 210-0 and 210-1 are coupled to the switch circuit 110 through the routing and arbitration logic 109.

The RAM circuits 220 and the RAM circuits 222 can be each divided into multiple groups of memory, e.g., an A group and a B group. The local memory interfaces 210-0 and 210-1 can include an interface for each group, e.g., an A interface to access the A group and a B interface to access the B group. The different groups can be used to store different kinds of information, such as data versus instructions. In the description below, the groups of RAM circuits 220 and 222 are discussed as a single logical unit of memory for the local memory 112 and a single logical unit of memory for the local memory 114.

In an example, the switch circuit 110 includes a multiplexer/de-multiplexer circuit (MUX/DMUX circuit 212) and a three-state buffer 218. The particular logic configuration of the switch circuit 110 shown in FIG. 2 is meant to illustrate the logical operation of the switch circuit 110. It is to be understood that, based on the logical operation of the switch circuit 110 described herein, those skilled in the art can design various configurations of logic gates and like components to implement such logical operation.

The MUX/DMUX circuit 212 provides multiplexing and de-multiplexing between the microprocessor 0 and the local memories 112 and 114. The MUX/DMUX circuit 212 can include a multiplexer/de-multiplexer 214 and a multiplexer 216. An output of the multiplexer/de-multiplexer 214 is coupled to the routing an arbitration logic 109. Inputs of the multiplexer/de-multiplexer 214 are coupled to the local memories 112 and 114. A control input of the multiplexer/de-multiplexer 214 is coupled to an output of the multiplexer 216. One input of the multiplexer 216 is configured to receive a local memory mode select signal. Another input of the multiplexer 216 is configured to receive a signal derived from a local memory interface. An output of the three-state buffer 218 is coupled to the routing and arbitration logic 109. An input of the three-state buffer 218 is coupled to the local memory 114. A control input of the three-state buffer 218 is coupled to receive the local memory mode select signal.

In operation, the multiplexer/de-multiplexer 214 selectively couples either the local memory 112 or the local memory 114 to the routing and arbitration logic 109 under control of the multiplexer 216. If the multiplexer 216 drives the control input of the multiplexer/de-multiplexer 214 with logic '0', the multiplexer/de-multiplexer 214 couples the local memory 112 to the routing and arbitration logic 109. Conversely, if the multiplexer 216 drives the control input of the multiplexer/de-multiplexer 214 with logic '1', the multiplexer/de-multiplexer 214 couples the local memory 114 to the routing and arbitration logic 109. Depending on the local memory mode select signal, the multiplexer 216 drives the control input of the multiplexer/de-multiplexer 214 with either a constant logic '0' or a logic value derived from signal(s) of the local memory interface(s) 210-0.

For example, if the mode select signal indicates that the switch circuit 110 should operate in independent local memory mode (e.g., is logic '1'), then the multiplexer 216 is controlled to provide the constant logic '0' as control input to the multiplexer/de-multiplexer 214. The MUX/DMUX 212 only couples the local memory 112 to the routing and arbitration logic 109 and there is no selective coupling. In addition, the three-state buffer 218 couples the local memory 114 to the routing and arbitration logic 109. Thus, each of the local memory 112 and 114 is independently accessible by the microprocessors 0 and 1. The independent local memory mode can be configured when the microprocessors are in the independent processor mode.

If the mode select signal indicates that the switch circuit 110 should operate in the combined local memory mode (e.g., is logic '0'), then the multiplexer 216 is controlled to provide a logic value derived from a signal of a local memory interface. In an example, a signal from an address portion of each local memory interface 210-0 and 210-1 is used as a bank select in that a logic '0' accesses the local memory 112 and a logic '1' accesses the local memory 114. Thus, in the second mode, the switch circuit 110 selectively couples either the microprocessor 0 or the microprocessor 1 to either the local memory 112 or the local memory 114 based on a bank select signal of the local memory interface(s) 210-0. A combination of the local memory 112 and 114 is accessible by either one of the microprocessors. The local memories 112 and 114 are not accessible as independent memories. The combined local memory mode can be configured when the microprocessors are in a non-independent mode, such as lockstep mode or single processor mode.

Figure 3:
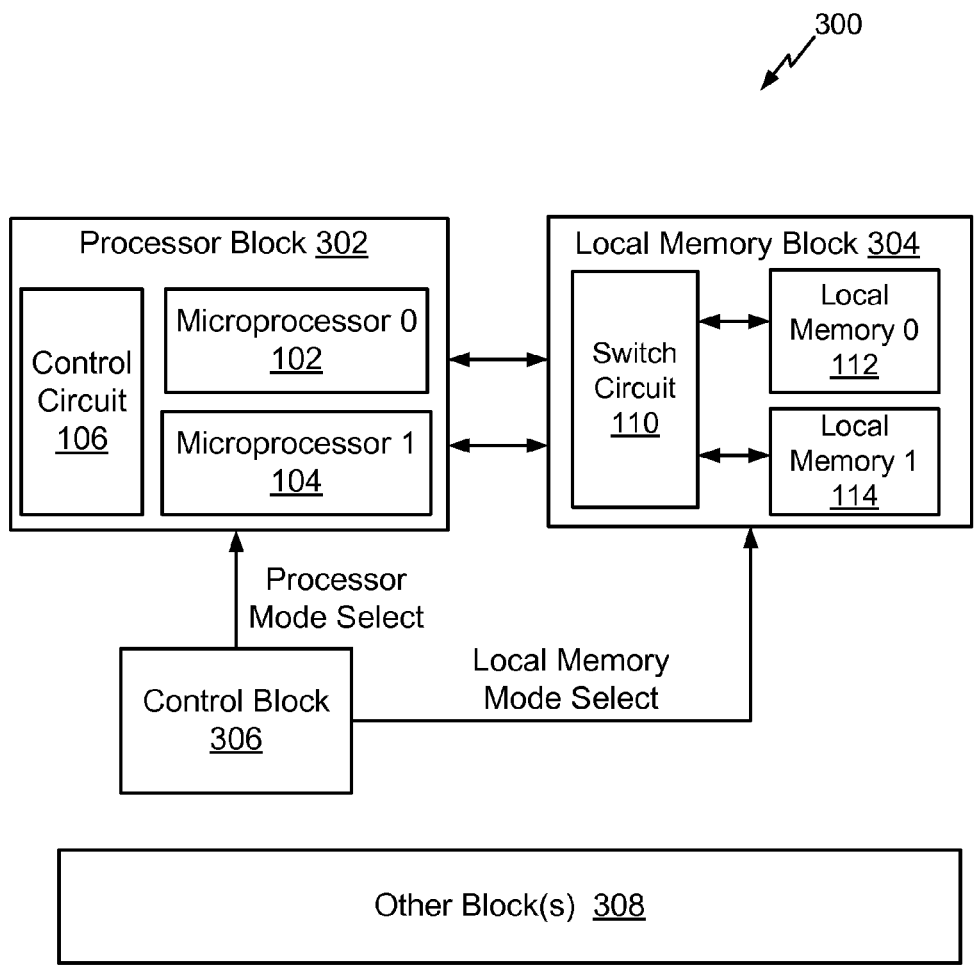
FIG. 3 is a block diagram depicting an integrated circuit according to an example implementation.

FIG. 3 is a block diagram depicting an integrated circuit 300 according to an example implementation. Elements of FIG. 1 that are the same or similar to those of FIG. 3 are designated with identical reference numerals and are described in detail above. The integrated circuit 300 includes a processor block 302, a local memory block 304, a control block 306, and various other block(s) 308. The processor block 302 includes the microprocessor 102, the microprocessor 104, and the control circuit 106. The local memory block 304 includes the local memory 112, the local memory 114, and the switch circuit 110. The control block 306 provides the processor mode select signal to the processor block 302, and the local memory mode select signal to the local memory block 304. The other block(s) 308 can include various other circuits, such as other processor blocks or other circuitry. In one example, the integrated circuit 300 can be a programmable device such that the other block(s) 308 include programmable circuitry. For example, the integrated circuit can be a field programmable gate array (FPGA), complex programmable logic device (CPLD), or the like.

Figure 4:
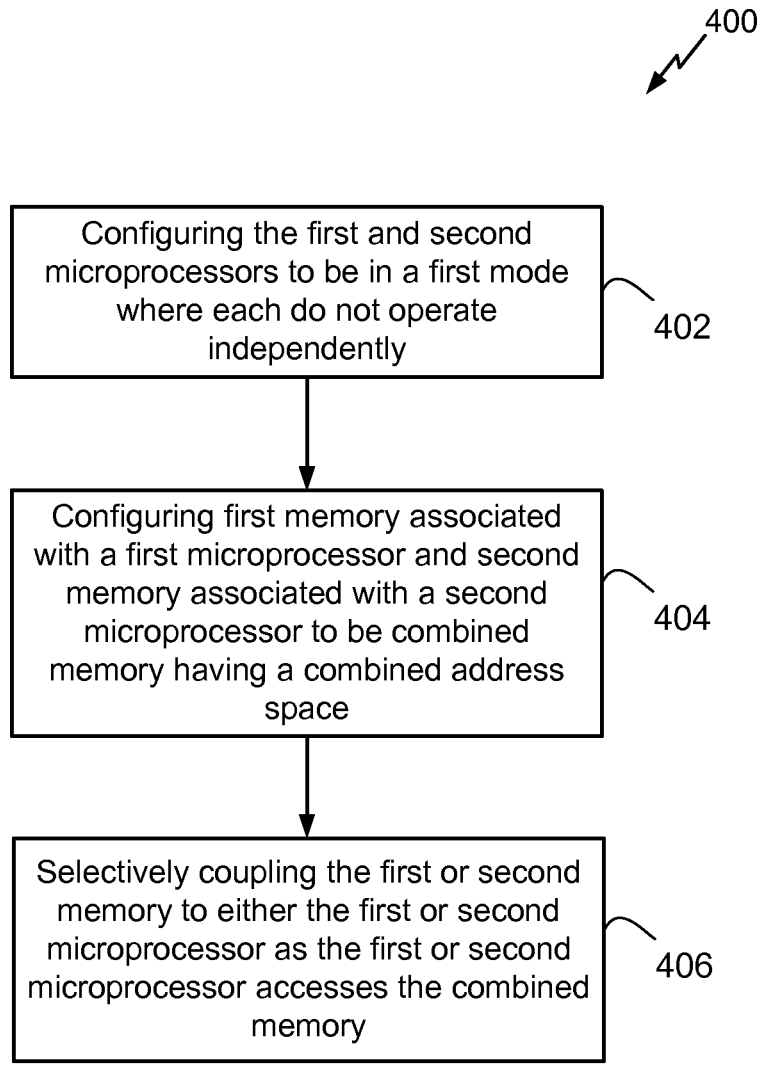
FIG. 4 is a flow diagram depicting a method of managing memory between first and second microprocessors according to an example implementation.

FIG. 4 is a flow diagram depicting a method 400 of managing memory between first and second microprocessors according to an example implementation. The method 400 can be understood with reference to the processing system of FIG. 1. The method 400 begins at step 402, where the control circuit 106 configures the first and second microprocessors 102 and 104 to be in a first mode where each do not operate independently (e.g., the lockstep processor mode or the single processor mode). At step 404, the switch circuit 110 configures a first memory associated with the first microprocessor (e.g., the local memory 112) and a second memory associated with the second microprocessor (e.g., the local memory 114) to be combined memory having a combined address space. At step 406, the switch circuit 110 selectively couples the first or second memory to either the first or second microprocessor 102 or 104 as the first or second microprocessor 102 or 104 accesses the combined memory.

Figure 5:
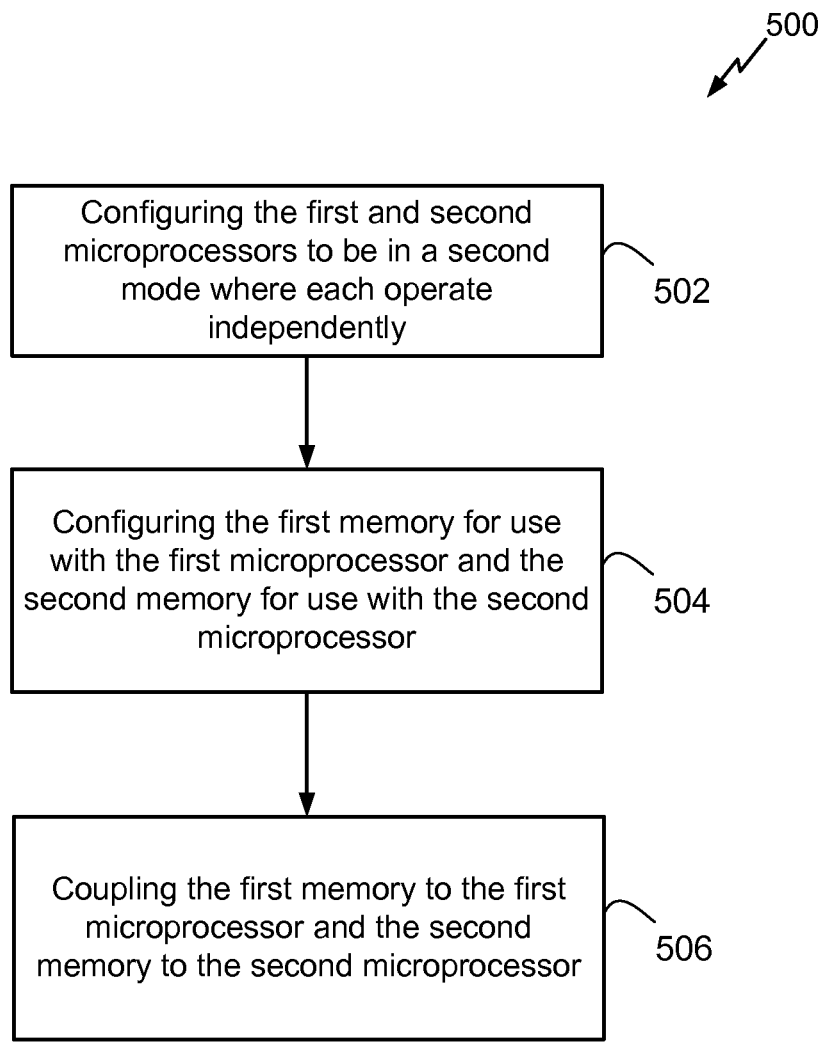
FIG. 5 is a flow diagram depicting another method of managing memory between first and second microprocessors according to an example implementation.

FIG. 5 is a flow diagram depicting a method 500 of managing memory between first and second microprocessors according to an example implementation. The method 500 can be understood with reference to the processing system of FIG. 1. The method 500 begins at step 502, where the control circuit 106 configures the first and second microprocessors 102 and 104 to be in a second mode where each operate independently (e.g., the independent processor mode). At step 504, the switch circuit 110 configures first memory for use with the first microprocessor (e.g., the local memory 112) and second memory for use with the second microprocessor (e.g., the local memory 114). At step 506, the switch circuit 110 couples the first memory to the first microprocessor 102 and the second memory to the second microprocessor 104.

While the foregoing is directed to examples of the present disclosure, other and further examples of the disclosure may be devised without departing from the basic scope thereof, and the scope thereof is determined by the claims that follow.

What is claimed is:

1. A circuit to manage memory between a first microprocessor and a second microprocessor each of which is coupled to a control circuit, comprising:
   first memory circuit and second memory circuit; and
   a switch circuit coupled to the first memory circuit, the second memory circuit, and memory interfaces of the first and second microprocessors, the switch circuit having a mode signal as input;
   wherein the switch circuit is configured to selectively operate in one of a first mode or a second mode based on the mode signal such that, in the first mode, the switch circuit couples the first memory circuit to the memory interface of the first microprocessor and the second memory circuit to the memory interface of the second microprocessor and, in the second mode, the switch circuit couples a combined memory having a combined address space formed by the first and second memory circuits to the memory interface of only one of the first and second microprocessors.

2. The circuit of claim 1, wherein the switch circuit operates in the second mode when the control circuit synchronizes the first microprocessor in lockstep with the second microprocessor.

3. The circuit of claim 1, wherein the switch circuit includes a multiplexing/de-multiplexing circuit coupled between the control circuit and the first and second memory circuits.

4. The circuit of claim 3, wherein the multiplexing/de-multiplexing circuit includes a control input coupled to a signal derived from the memory bus of either the first or second microprocessor where, in the second mode, the switch circuit selectively couples the first or second memory circuits to the memory interface of either the first or second microprocessor based on the control input.

5. The circuit of claim 1, wherein each of the first and second memory circuits includes at least one random access memory (RAM) circuit.

6. The circuit of claim 5, wherein each RAM circuit forms a continuous area of memory that is always valid when in use by one of the first or second microprocessors.

7. The circuit of claim 1, wherein each of the first and second memory circuits comprises error-correcting code (ECC) memory circuits.

8. An integrated circuit, comprising:
first and second microprocessors;
a control circuit coupled to the first and second microprocessors;
first and second memory circuits; and
a switch circuit coupled to the first memory circuit, the second memory circuit, and the control circuit, the switch circuit having a mode signal as input;
wherein the switch circuit is configured to selectively operate in one of a first mode or a second mode based on the mode signal such that, in the first mode, the switch circuit couples the first memory circuit to the memory interface of the first microprocessor and the second memory circuit to the memory interface of the second microprocessor and, in the second mode, the switch circuit couples a combined memory having a combined address space formed by the first and second memory circuits to the memory interface of only one of the first and second microprocessors.

9. The integrated circuit of claim 8, wherein the switch circuit operates in the second mode when the control circuit synchronizes the first microprocessor in lockstep with the second microprocessor.

10. The integrated circuit of claim 8, wherein each of the first and second memory circuits includes at least one random access memory (RAM) circuit.

11. The integrated circuit of claim 10, wherein each RAM circuit forms a continuous area of memory that is always valid when in use by one of the first or second microprocessors.

12. The integrated circuit of claim 8, wherein each of the first and second memory circuits comprises error-correcting code (ECC) memory circuits.

13. The integrated circuit of claim 8, further comprising control logic configured to provide the mode signal to the switch circuit.

14. A method of managing memory between a first microprocessor and a second microprocessor each of which is coupled to a control circuit, comprising:

configuring the first microprocessor and the second microprocessor to be in a first mode where each of the first and second microprocessors do not operate independently;
configuring first memory associated with the first microprocessor and second memory associated with the second microprocessor to be combined memory having a combined address space; and
selectively coupling the first or second memory to only one of the first or second microprocessor as the one of the first or second microprocessor accesses the combined memory.

15. The method of claim 14, wherein the second microprocessor operates in lockstep with the first microprocessor in the first mode.

16. The method of claim 14, wherein the step of selectively coupling comprises selecting either the first memory or the second memory based on a portion of an address for each access to the combined memory by the first or second microprocessor.

17. The method of claim 14, wherein each of the first and second memory comprises at least one random access memory (RAM) circuit.

18. The method of claim 17, wherein each RAM circuit forms a continuous area of memory that is always valid when in use by one of the first or second microprocessors.

19. The method of claim 14, wherein each of the first and second memory comprises error-correcting code (ECC) memory circuits.

20. The method of claim 14, further comprising:
configuring the first microprocessor and the second microprocessor to be in a second mode where each of the first and second microprocessors operate independently;
configuring the first memory for use with the first microprocessor and the second memory for use with the second microprocessor; and
coupling the first memory to the first microprocessor and the second memory to the second microprocessor.

* * * * *